US012785778B2

(12) United States Patent
Deghel

(10) Patent No.: US 12,785,778 B2
(45) Date of Patent: Nov. 3, 2026

(54) SPATIAL PATTERN ADAPTATION

(71) Applicant: Nokia Technologies Oy, Espoo (FI)

(72) Inventor: Matha Deghel, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 297 days.

(21) Appl. No.: 18/432,763

(22) Filed: Feb. 5, 2024

(65) Prior Publication Data

US 2024/0283516 A1 Aug. 22, 2024

(30) Foreign Application Priority Data

Feb. 17, 2023 (GB) ..................................... 2302259

(51) Int. Cl.
*H04B 7/06* (2006.01)
*H04L 5/00* (2006.01)
*H04W 24/10* (2009.01)

(52) U.S. Cl.
CPC ......... *H04B 7/0691* (2013.01); *H04L 5/0051* (2013.01); *H04W 24/10* (2013.01)

(58) Field of Classification Search
CPC ..... H04B 7/0619; H04B 7/0691; H04L 5/005; H04L 5/0051; H04L 5/0057
See application file for complete search history.

(56) References Cited

U.S. PATENT DOCUMENTS

2016/0105817 A1 4/2016 Frenne et al.
2019/0281487 A1 9/2019 Liu et al.
2019/0335416 A1 10/2019 Kumar et al.
2020/0396035 A1* 12/2020 Yu ......................... H04L 5/0023

FOREIGN PATENT DOCUMENTS

WO 2021/217328 A1 11/2021
WO 2022/077414 A1 4/2022
WO 2022/126148 A2 6/2022

OTHER PUBLICATIONS

Extended European Search Report received for corresponding European Patent Application No. 24156558.9, dated Jul. 10, 2024, 12 pages.

(Continued)

*Primary Examiner* — Zhensheng Zhang
(74) *Attorney, Agent, or Firm* — Carter, DeLuca & Farrell LLP

(57) ABSTRACT

Example embodiments of the present disclosure relate to spatial pattern adaptation. An apparatus determines, based at least on a spatial pattern switching between at least two spatial patterns of a network device, one or more reference signal, RS, resources or RS occurrences from a plurality of RS resources or RS occurrences. The apparatus transmits, to the network device, at least one report comprising one or more measurements based at least on the one or more RS resources or RS occurrences. In this way, channel and interference measurement performance can be adapted to the dynamic switching of antennal or spatial pattern. Both the UE and the gNB have a common knowledge of which resources are used by the UE for deriving channel and interference measurement.

1 Claim, 8 Drawing Sheets

(56) References Cited

OTHER PUBLICATIONS

"Discussion on NW energy saving techniques", 3GPP TSG RAN WG1 meeting #110bis-e, R1-2209196, Agenda: 9.7.2, ZTE, Oct. 10-19, 2022, pp. 1-15.
"3rd Generation Partnership Project; Technical Specification Group Radio Access Network; NR; Physical layer procedures for data (Release 17)", 3GPP TS 38.214, V17.4.0, Dec. 2022, pp. 1-231.
"3rd Generation Partnership Project; Technical Specification Group Radio Access Network; NR; Physical layer procedures for control (Release 17)", 3GPP TS 38.213, V17.4.0, Dec. 2022, pp. 1-258.
"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"CSI reference resource for aperiodic CSI report with periodic or semi-persistent measurement resource", 3GPP TSG RAN WG1 #111, R1-2211791, Agenda: 7.1, Apple Inc, Nov. 14-18, 2022, 5 pages.
"IEEE 802.11", Wikipedia, Retrieved on Feb. 26, 2024, Webpage available at : https://en.wikipedia.org/wiki/IEEE_802.11.
Search Report received for corresponding United Kingdom Patent Application No. 2302259.3, dated Aug. 24, 2023, 5 pages.
"On techniques aspects for network energy savings", 3GPP TSG-RAN WG1 Meeting #111, R1-2210859, Agenda: 9.7.2, Huawei, Nov. 14-18, 2022, 12 pages.
"Discussion on network energy saving techniques", 3GPP TSG RAN WG1 #111, R1-2211692, Agenda: 9.7.2, CMCC, Nov. 14-18, 2022, 22 pages.

* cited by examiner

SPATIAL PATTERN ADAPTATION

CROSS-REFERENCE TO RELATED APPLICATION

This application claims priority from, and the benefit of, GB Application No. 2302259.3, filed on 17 Feb. 2023, which is incorporated herein by reference in its entirety.

FIELD

Various example embodiments of the present disclosure generally relate to the field of telecommunication and in particular, to methods, devices, apparatuses and computer readable storage medium for spatial pattern adaptation.

BACKGROUND

As 5G is becoming pervasive across industries and geographical areas, handling more advanced services and applications requires very high data rates (e.g., extended reality (XR)), networks become denser with more antennas, larger bandwidths, and more frequency bands. Among various requirements, network energy saving is of great importance for environmental sustainability, to reduce environmental impacts, and for operational cost savings.

To this end, the network may dynamically switch between various antenna spatial patterns that correspond to e.g. different sets of antenna elements. However, such a spatial adaptation may affect UE performances. Therefore, further improvements are need for spatial pattern adaptation.

SUMMARY

In general, example embodiments of the present disclosure provide a solution of spatial pattern adaptation.

In a first aspect of the present disclosure, there is provided an apparatus. The apparatus comprises at least one processor; and at least one memory storing instructions that, when executed by the at least one processor, cause the apparatus at least to: determine, based at least on a spatial pattern switching between at least two spatial patterns of a network device, one or more reference signal, RS, resources or RS occurrences from a plurality of RS resources or RS occurrences; and transmit, to the network device, at least one report comprising one or more measurements based at least on the one or more RS resources or RS occurrences.

In a second aspect of the present disclosure, there is provided an apparatus. The apparatus comprises at least one processor; and at least one memory storing instructions that, when executed by the at least one processor, cause the apparatus at least to: receive, from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the apparatus.

In a third aspect of the present disclosure, there is provided a method. The method comprises: determining, by a terminal device and based at least on a spatial pattern switching between at least two spatial patterns of a network device, one or more RS resources or RS occurrences from a plurality of RS resources or RS occurrences; and transmitting, by the terminal device and to the network device, at least one report comprising one or more measurements based at least on the one or more RS resources or RS occurrences.

In a fourth aspect of the present disclosure, there is provided a method. The method comprises: receiving, by a network device and from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the network device.

In a fifth aspect of the present disclosure, there is provided an apparatus. The apparatus comprises: means for determining, based at least on a spatial pattern switching between at least two spatial patterns of a network device, one or more RS resources or RS occurrences from a plurality of RS resources or RS occurrences; and means for transmitting, to the network device, at least one report comprising one or more measurements based at least on the one or more RS resources or RS occurrences.

In a sixth aspect of the present disclosure, there is provided an apparatus. The apparatus comprises: means for receiving, from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the apparatus.

In a seventh aspect of the present disclosure, there is provided a non-transitory computer readable medium. The non-transitory computer readable medium comprises program instructions that, when executed by an apparatus, cause the apparatus to perform at least the following: determining, based at least on a spatial pattern switching between at least two spatial patterns of a network device, one or more RS resources or RS occurrences from a plurality of RS resources or RS occurrences; and transmitting, to the network device, at least one report comprising one or more measurements based at least on the one or more RS resources or RS occurrences.

In an eighth aspect of the present disclosure, there is provided a non-transitory computer readable medium. The non-transitory computer readable medium comprises program instructions that, when executed by an apparatus, cause the apparatus to perform at least the following: receiving, from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the apparatus.

In a ninth aspect of the present disclosure, there is provided a computer program comprising instructions which, when executed by an apparatus, cause the apparatus to perform at least the following: determining, based at least on a spatial pattern switching between at least two spatial patterns of a network device, one or more RS resources or RS occurrences from a plurality of RS resources or RS occurrences; and transmitting, to the network device, at least one report comprising one or more measurements based at least on the one or more RS resources or RS occurrences.

In a tenth aspect of the present disclosure, there is provided a computer program comprising instructions which, when executed by an apparatus, cause the apparatus to perform at least the following: receiving, from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the apparatus.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
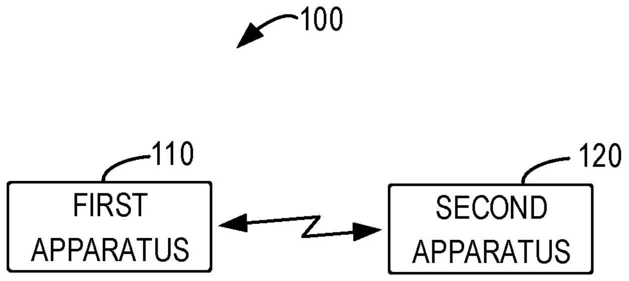
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT)

and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term “network device” refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term “terminal device” refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms “terminal device”, “communication device”, “terminal”, “user equipment” and “UE” may be used interchangeably.

As used herein, the term “control device” refers to any entity/function/device/apparatus for control. In some example embodiments, the control device is device used for implementing domain orchestration, network optimization and network management functions and so on.

As used herein, the term “system information” refers to various types of system information blocks (SIB), as well as the equivalents with different names according to any suitable generation communication protocols and/or communication standards either currently known or to be developed in the future.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 illustrates an example communication environment 100 in which example embodiments of the present disclosure can be implemented. The communication environment 100 may be a communication network supporting spatial pattern adaptation. The first apparatus 110 and the second apparatus may communicate with each other.

The first apparatus 110 may be a terminal device, such as, UE, which may also be referred to the terminal device 110 hereinafter. The second apparatus 120 may be a network device, such as, a gNB, a transmission Reception Point (TRP), act., which may also be referred to the network device 120 hereinafter.

Figure 2:
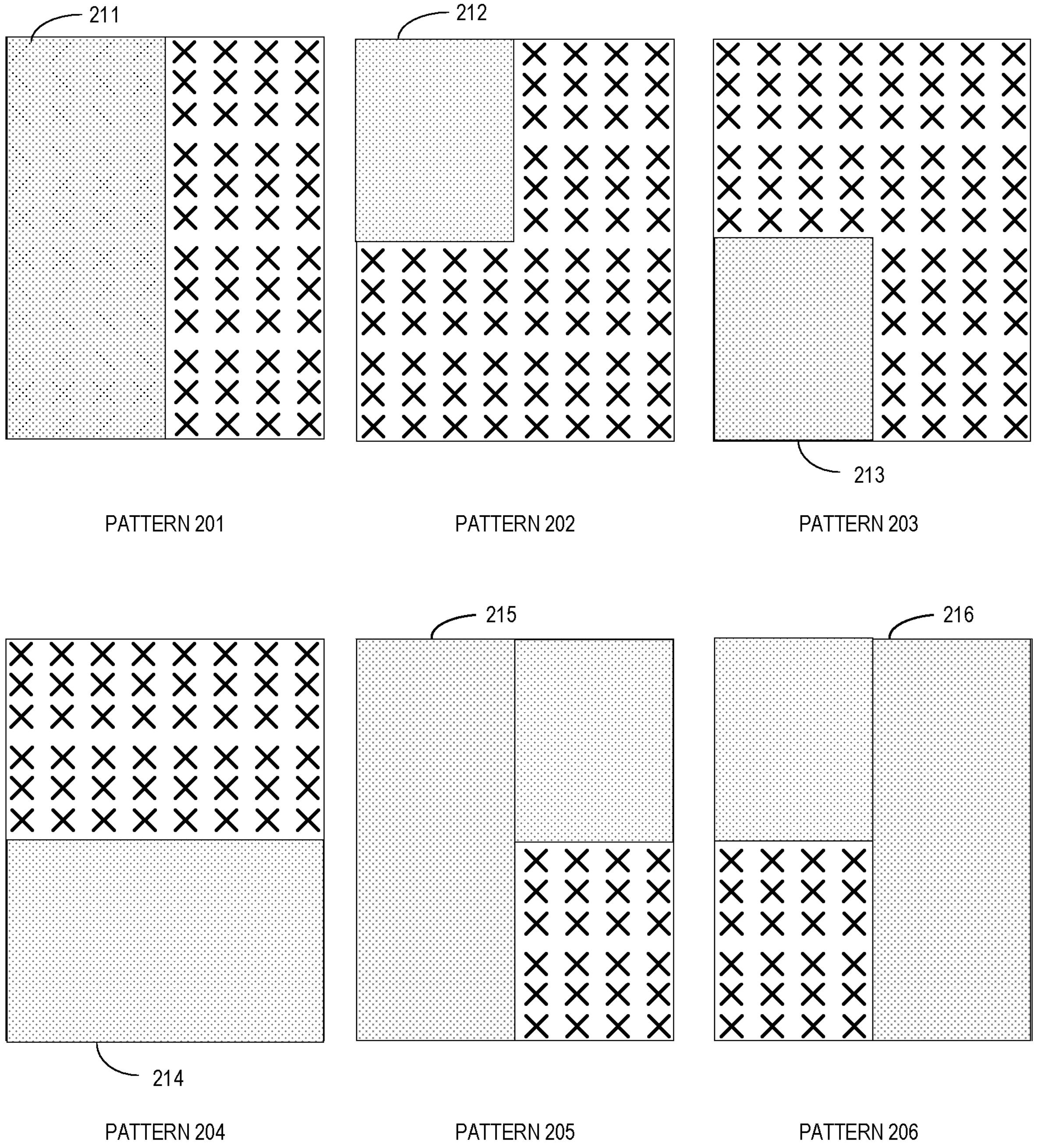
FIG. 2 illustrates a schematic diagram of example antenna/spatial patterns according to some example embodiments of the present disclosure.

The second apparatus 120 may have multiple spatial elements or antennal elements for radio transmission. In particular, various combinations of a part or all of the multiple antennal elements may correspond to different antenna/spatial pattern. FIG. 2 illustrates a schematic diagram of example antenna/spatial patterns 201 to 206 according to some example embodiments of the present disclosure. As shown, a panel of the second apparatus comprises a plurality of antenna elements, which may form an antenna array. In pattern 201, the left half 211 of the panel is muted, i.e., deactivated, while the right half of the panel is activated/active. In pattern 202, the upper left part 212 of the panel is muted, while the rest part of the panel is activated/active. In pattern 203, the bottom left part 213 of the panel is muted, while the rest part of the panel is activated/active. In pattern 204, the bottom half 214 of the panel is muted, while the top half of the panel is activated. In pattern 205, except for the bottom right part of the panel, all the other parts are muted. In pattern 206, except for the bottom right part of the panel, all the other parts are muted. For the purposes of beam management and/or energy saving, the second apparatus 120 may dynamically adopt different spatial patterns, and thus spatial pattern switching may occur.

In some example embodiments, the second apparatus 120 may transmit reference signals (RSs) to the first apparatus 110 by apply at least one spatial pattern. For example, the reference signal may comprise a Channel State information reference signal (CSI-RS) that may be used for channel and interference measurements.

In some cases, CSI-RS may be spatially beamformed into different directions. CSI-RS has many functions, for example, CSI-RS for DL CSI acquisition, CSI-RS for beam management (BM) (based on L1-RSRP), CSI-RS for tracking (TRS), UL CSI acquisition in reciprocity-based UL precoding, and so on. In some example embodiments, the first apparatus 110 may be configured with up to 48 report configurations per component carrier (CC)/4 per bandwidth part (BWP). One CSI resource configuration within one report configuration may be configured with up to 16 resource sets (e.g., aperiodic CSI) or otherwise, 1 resource set. In each CSI resource set, there are up to 64 NZP CSI-RS resources, and each NZP-CSI-RS resource corresponds to up to 32 antenna ports.

For CSI acquisition, the first apparatus 110 may be configured with a codebook type. Given the measured channel across a CSI-RS resource, the first apparatus 110 may choose a codeword from the specified codebook, i.e., precoding matrix indicator (PMI), along with channel quality indicator (CQI), rank indicator (RI). The first apparatus 110 may also be configured to measure several CSI-RS resources (up to 8) within a resource set and report the favorite resource, CSI-RS resource indicator (CRI), along with PMI, CQI and RI which corresponds to that selected resource.

The CSI-RS may be configured for periodic, semi-persistent, or aperiodic transmission. In the case of periodic CSI-RS transmission, the first apparatus 110 may assume that a configured CSI-RS transmission occurs every Nth slot, where N ranges from as low as four, that is, the CSI-RS transmission occur every fourth slot, to as high as 640, that is, the CSI-RS transmission occurs every 640th slot. In addition to the periodicity, the first apparatus 110 may also be configured with a specific slot offset for the CSI-RS transmission.

In the case of semi-persistent CSI-RS transmission, a certain CSI-RS periodicity and corresponding slot offset may be configured in the same way as for periodic CSI-RS transmission. However, the actual CSI-RS transmission may be activated or deactivated based on medium access control (MAC) control elements (CEs). Once the CSI-RS transmission has been activated, the first apparatus 110 may assume that the CSI-RS transmission will continue according to the configured periodicity until it is explicitly deactivated. Similarly, once the CSI-RS transmission has been deactivated, the first apparatus 110 may assume that there will be no CSI-RS transmissions according to the configuration until it is explicitly reactivated.

In case of aperiodic CSI-RS, no periodicity is configured. Rather, the first apparatus 110 may be explicitly informed or triggered of each CSI-RS transmission instant by means of signaling in downlink control information (DCI).

Note that the property of periodic, semi-persistent, or aperiodic should not be considered as a property of the CSI-RS itself but rather the property of a CSI-RS resource set. Therefore, activation/deactivation and triggering of semi-persistent and aperiodic CSI-RS, respectively, is not done for a specific CSI-RS but for the set of CSI-RS within a resource set.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of apparatuses and their connections shown in FIG. 1 are only for the purpose of illustration without suggesting any limitation. The communication environment 100 may include any suitable number of apparatuses configured to implementing example embodiments of the present disclosure. Although not shown, it would be appreciated that one or more additional devices or apparatuses may be located comprised in the communication environment 100. It is noted that although being illustrated as a terminal device, the first apparatus 110 may be another device than a terminal device. Although being illustrated as a network device, the second apparatus 120 may be another device than a network device.

In the following, for the purpose of illustration, some example embodiments are described with the first apparatus 110 operating as a terminal device, and the second apparatus 120 operating as a network device, or in particular, the gNB. However, in some other embodiments, operations described in connection with a terminal device may be implemented at a network device or other device, and operations described in connection with a network device may be implemented at a terminal device or other device.

In some example embodiments, if the first apparatus 110 is a terminal device and the second apparatus 120 is a network device, a link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver).

In a spatial adaptation scenario, the terminal device may perform channel or interference measurements on CSI-RSs, and report a measurement result to the gNB. The spatial pattern switching applied at the gNB may impact such CSI and beam management related procedure.

More specifically, when a new spatial pattern is applicable, i.e., applied by the gNB, this pattern may correspond to less or more spatial elements (such as, less or more active antenna elements, antenna subarrays, antenna ports, energy/power level, energy/power saving level, priority, etc.) compared to a previous spatial pattern applied by the gNB. An issue appears when the new spatial pattern becomes applicable within a channel/interference measurement period, which may be also referred to as spatial pattern switching. For example, this spatial pattern may impact CSI-RS resources or occurrences measured by the UE. Note that the UE would measure these multiple CSI-RS occurrences/resources, and temporally average corresponding measurements so as to improve the channel/interference estimation performance.

However, if the UE uses measurements from CSI-RS resources/occurrences corresponding to at least two different spatial patterns, the derivation of CSI (e.g., based on temporally averaging measurements performed on these CSI-RS resources/occurrences) may be corrupted. On the other hand, the gNB is unaware that which resources/occurrences the UE uses for deriving the CSI. For example, the gNB does not know the resources/occurrences corresponding to a previous spatial pattern, to a current spatial pattern, or a mix of both. As a result, the channel and interference measurement performances are corrupted.

According to some example embodiments of the present disclosure, there is provided a solution for spatial pattern adaptation. In this solution, the terminal device determines, based at least on a spatial pattern switching between at least two spatial patterns of a network device, one or more RS, resources or RS occurrences from a plurality of RS resources or RS occurrences. The terminal device then transmits, to the network device, at least one report comprising one or more measurements based at least on the one or more RS resources or RS occurrences.

This solution ensures that both the gNB and UE have common understanding to which spatial pattern(s) is used for measuring RSs. In this way, spatial pattern switching would not impact channel and interference measurement performance, as it can be suitably adapted to the dynamic switching of antennal or spatial pattern.

Example embodiments of the present disclosure will be described in detail below with reference to the accompanying drawings.

Figure 3:
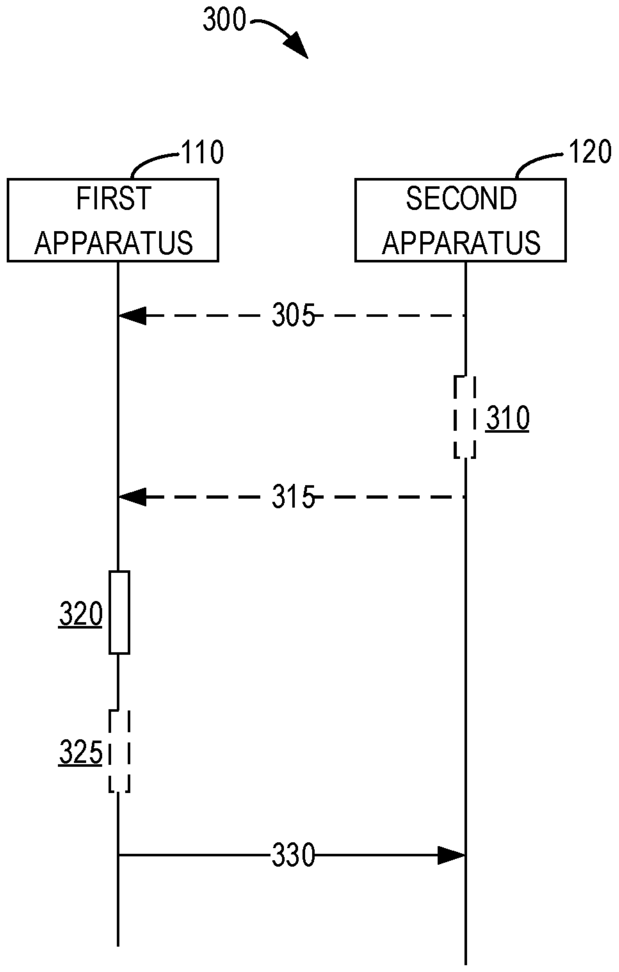
FIG. 3 illustrates a signaling chart for spatial pattern adaptation according to some example embodiments of the present disclosure.

Reference is now made to FIG. 3, which illustrates a signaling chart for spatial pattern adaptation 300 according to some example embodiments of the present disclosure. As shown in FIG. 3, the process 300 involves the first apparatus 110 and the second apparatus 120. For the purpose of discussion, reference is made to FIG. 1 to describe the signaling flow 300.

For the purpose of description, in the following embodiments, CSI-RS is given as an example of reference signals transmitted by the network. However, it should be understood that the example embodiments are applicable to any other reference signals. Thus, the present disclosure is not limited in this regard.

During the process 300, the second apparatus 120 may apply at least two spatial patterns, for example, any two or more spatial patterns as shown in FIG. 2, or any other spatial pattern not shown. Thus, a spatial pattern switching between the at least two spatial patterns may occur. When the second apparatus 120 switches from a previous spatial pattern to a new spatial pattern, the new spatial pattern may impact CSI-RS resources or CSI-RS occurrences used for channel and/or interference measurements. In this case, the first apparatus 110 may select one or more subsets of these CSI-RS resources or CSI-RS occurrences for deriving CSI-RS measurements and thus the CSI report.

In the process 300, the second apparatus 120 may triggering CSI report corresponding to a plurality of RS resources or RS occurrences. Moreover, the second apparatus 120 may transmit CSI-RSs to the first apparatus 110 in a periodic manner or in a semi-persistent manner. It should be understood that the transmission of the CSI-RSs may be performed throughout at least a part of the process 300, and in parallel to at least another step in process 300, for example, step 310, 315, etc.

The second apparatus 120 may determine 310 that a new spatial pattern is or can be applicable. For example, this determination may be made for purpose of energy saving. As previously mentioned, the new spatial pattern may impact the CSI-RS resources or CSI-RS occurrences used for CSI measurements.

In this case, the second apparatus 120 may transmit 315 information related to the spatial pattern switching, for example, an indication of the new spatial pattern, or an indication of whether some or all RS resources are impacted by the new spatial pattern or not. In some example embodiments, the information related to the spatial pattern switching may indicate that the spatial pattern switching is applied when the information is received by the first apparatus 110.

Additionally, or alternatively, in some example embodiments, the information related to the spatial pattern switching may indicate that the spatial pattern switching is applied after a time period when the information is received by the first apparatus 110. In this way, the second apparatus 120 is able to inform the first apparatus 110 of the spatial pattern switching before or during switching from the previous spatial pattern to the new spatial pattern. Additionally, or alternatively, the time period may comprise or may be for accommodating some transient period needed for switching from a spatial pattern to another spatial pattern.

An antenna/spatial pattern may correspond to or be represented by one or more of the following factors or parameters:

- One or more antenna muting patterns,
- One or more numbers or sets of active or muted antenna/spatial elements,
- One or more numbers or sets of (active or muted) antenna ports,
- One or more report or codebook or spatial configurations,
- One or more CSI-RS resources or resource sets,
- Value(s) of one or more parameters or configurations for a CSI-RS resource or CSI-RS resource set,
- One or more energy/power levels, energy saving levels or priorities,
- One or more set of TCI states, Accordingly, in some example embodiments, a change or switching of antenna/spatial pattern may correspond to any change of one or more of the above factors or parameters.

Based on such information, the first apparatus 110 is aware of the spatial pattern switching between at least two spatial patterns of the second apparatus 120. It should be understood that the awareness or determination of when the spatial pattern switching and/or the new spatial pattern is applicable may be based on an approximate estimate of the first apparatus 110, rather than the actual and precise time where the spatial pattern switching and/or the new spatial pattern is applied at the second apparatus 120.

The first apparatus 110 determines 320, based at least on a spatial pattern switching between at least two spatial patterns, one or more reference signal, RS, resources or RS occurrences from a plurality of RS resources or RS occurrences. In particular, the first apparatus 110 may consider whether to use: (i) one or more RS resources or RS occurrences occur before the spatial pattern switching, (ii) one or more RS resources or RS occurrences occur after the spatial pattern switching, or (iii) a part of the one or more RS resources or RS occurrences occur before the spatial pattern switching and another part of the one or more RS resources or RS occurrences occur after the spatial pattern switching for deriving CSI.

In some example embodiments, the first apparatus 110 may select at least a subset of the plurality of RS resources or RS occurrences for RS measurements, for example, via RRC signaling. In this case, the determination of RS resources or RS occurrences adapted to spatial pattern switching relies on UE's selection or decision. In addition, a further signaling of indicating the RS resources or RS occurrences adapted to spatial pattern switching may be needed. For example, the first apparatus 110 may then provide an indication or information (e.g., in form of uplink control information (UCI) or uplink medium access control control element (UL MAC CE)) to the second apparatus 120.

Alternatively, in some example embodiments, the first apparatus 110 may receive an indication from the second apparatus 120 for indicating the one or more RS resources or RS occurrences to be determined by the first apparatus 110 from the plurality of RS resources or RS occurrences. For example, the indication may be provided, either separately or along with the information related to the spatial pattern switching, via downlink control information (DCI), MAC CE, or RRC signaling. In this case, the determination of RS resources or RS occurrences adapted to spatial pattern switching relies on gNB's indication.

Alternatively, in some example embodiments, which one or more RS resources or RS occurrences should be used for deriving CSI may be specified or predetermined at the first apparatus 110. In this case, no further signaling of indicating the RS resources or RS occurrences adapted to spatial pattern switching is needed.

Figure 4A:
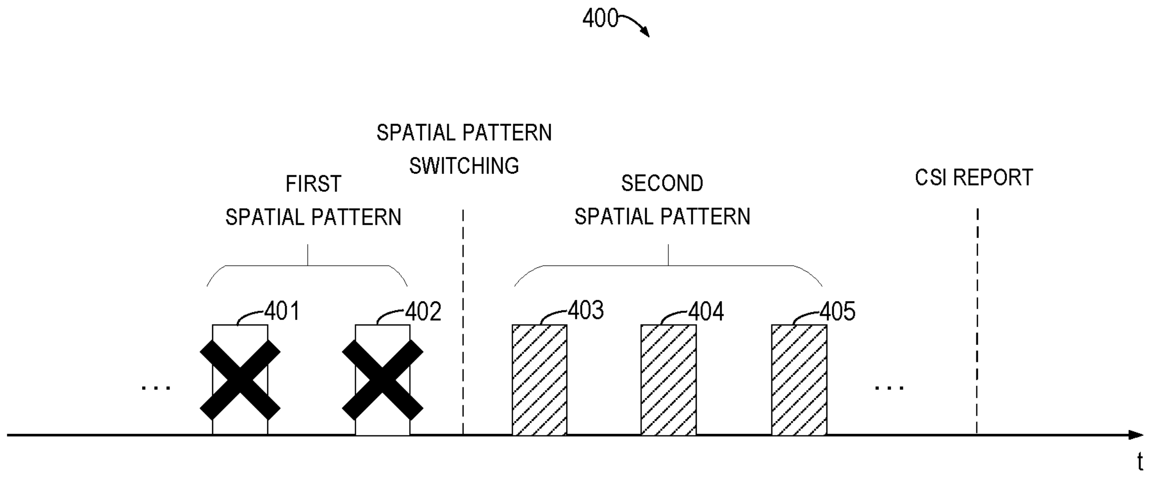
FIG. 4A to FIG. 4D illustrate schematic diagrams of a determination of RS resources or RS occurrences adapted to spatial pattern switching based on the spatial pattern switching according to some example embodiments of the present disclosure.
Figure 4B:
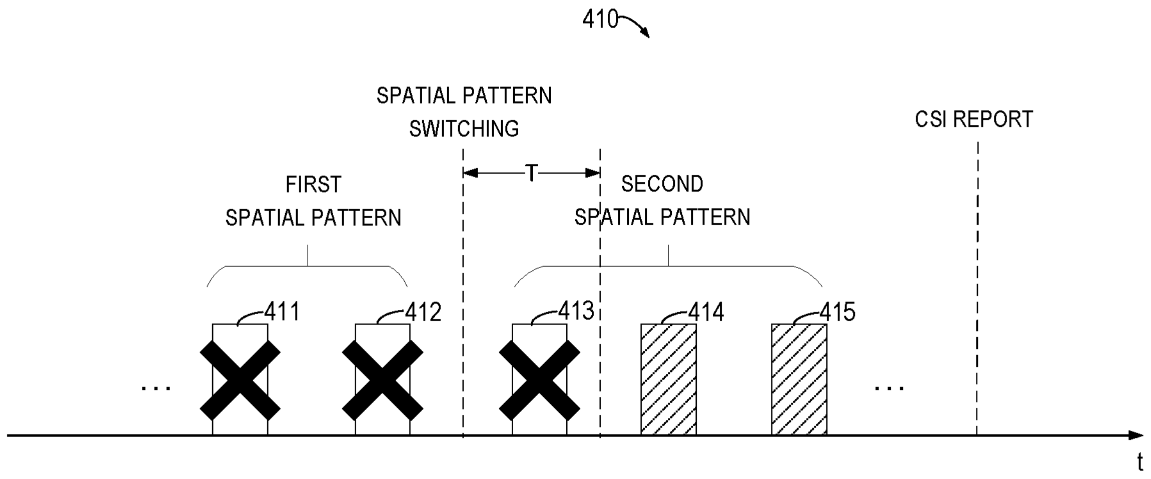
Figure 4C:
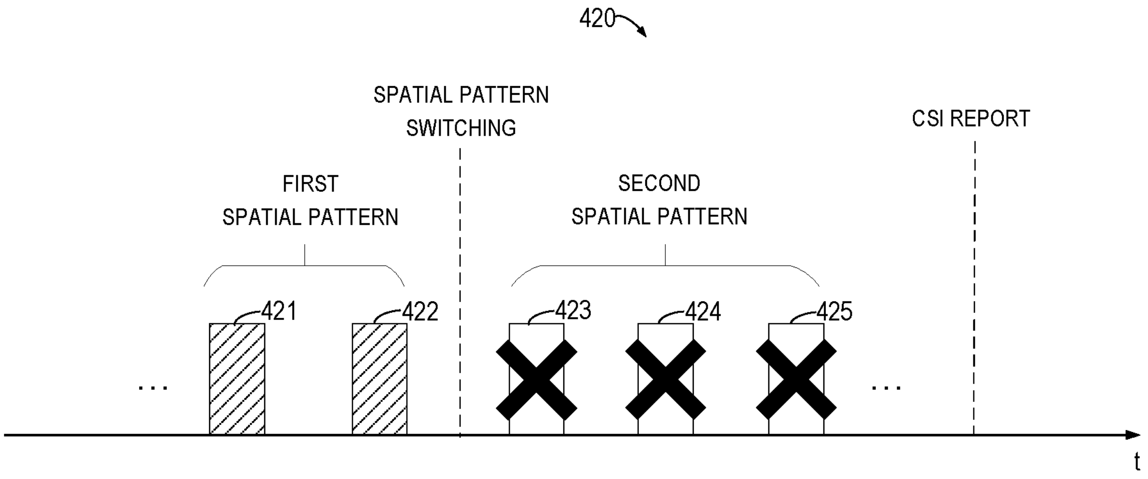
Figure 4D:
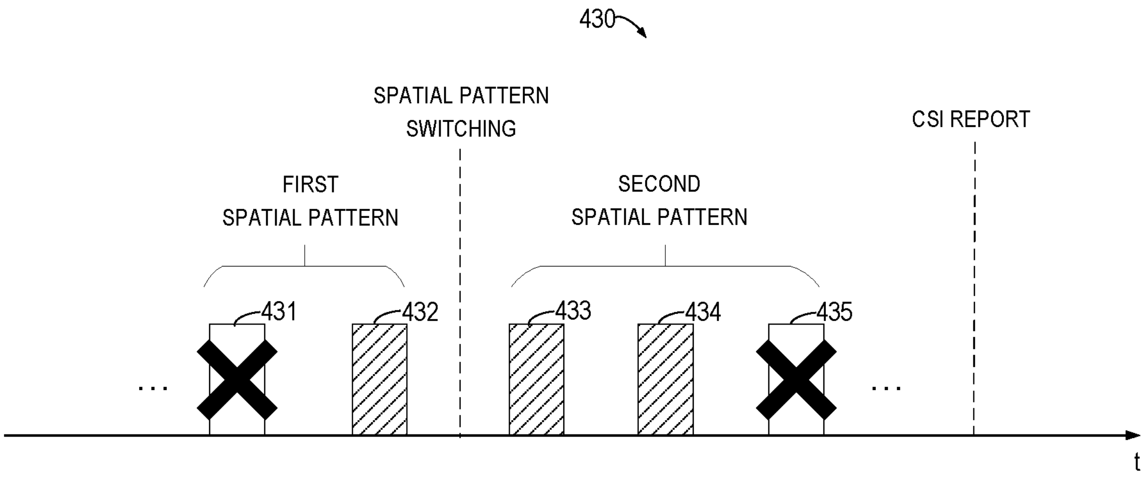

To sum up, if the spatial pattern switching impacts at least one RS resource or RS occurrence used for channel or interference measurements, for example, by impacting one or more of its parameters or related configurations, the first apparatus 110 may follow one or more of the following rules (either as specified, as indicated, or as configured):

- deriving CSI based on measurements on one or more RS resources or RS occurrences occurring immediately after the spatial pattern switching. As shown in FIG. 4A, RS resources or RS occurrences 401 and 402 occurs before the spatial pattern switching and thus correspond to the previous spatial pattern, and RS resources or RS occurrences 403 to 405 occurs after the spatial pattern switching and thus correspond to the new spatial pattern. Thus, based on the rule, the RS resources or RS occurrences 401 and 402 are omitted, and the RS resources or RS occurrences 403 to 405 are selected for deriving the CSI report. In this case, the CSI report is based on the new spatial pattern.
- deriving CSI based on measurements on one or more RS resources or RS occurrences occurring after a configured period of time from the spatial pattern switching. As shown in FIG. 4B, RS resources or RS occurrences 411 and 412 occurs before the spatial pattern switching and thus correspond to the previous spatial pattern, and RS resources or RS occurrences 413 to 415 occurs after the spatial pattern switching and thus correspond to the new spatial pattern, where the RS resource or RS occurrence 413 occurs within the period of time T from the spatial pattern switching. Thus, based on the rule, the RS resources or RS occurrences 411 to 413 are omitted, and the RS resources or RS occurrences 414 to 415 are selected for deriving the CSI report. In this case, the CSI report is based on the new spatial pattern.
- deriving CSI based on measurements on one or more RS resources or RS occurrences occurring before the spatial pattern switching. As shown in FIG. 4C, RS resources or RS occurrences 421 and 422 occurs before the spatial pattern switching and thus correspond to the previous spatial pattern, and RS resources or RS occurrences 423 to 425 occurs after the spatial pattern switching and thus correspond to the new spatial pattern. Thus, based on the rule, the RS resources or RS occurrences 423 to 425 are omitted, and the RS resources or RS occurrences 421 to 422 are selected for deriving the CSI report. In this case, the CSI report is based on the previous spatial pattern.
- deriving CSI based on measurements on a part of the one or more RS resources or RS occurrences occurring before the spatial pattern switching and another part of the one or more RS resources or RS occurrences occur after the spatial pattern switching. As shown in FIG. 4D, RS resources or RS occurrences 431 and 432 occurs before the spatial pattern switching and thus correspond to the previous spatial pattern, and RS resources or RS occurrences 433 to 435 occurs after the spatial pattern switching and thus correspond to the new spatial pattern. Depending on the rule, a part of the RS resources or RS occurrences 431 and 432 and a part of the RS resources or RS occurrences 433 to 435 are selected for deriving the CSI report, for example, RS resources or RS occurrences 432 to 434, while the rest of them are omitted, for example, the RS resources or RS occurrences 431 and 435. In this case, the CSI report is based on both the previous spatial pattern and the new spatial pattern.

It's worth mentioning that, if the impact of the new spatial pattern on at least one RS resource or occurrence consists in e.g., update/change (such as, omitting) of number of REs or number of ports for this CSI-RS resource(s) or resource set (or any other change on or related to the at least one RS resource or occurrence), the first apparatus 110 may be based on RS resources or RS occurrences that occur (immediately) after the new spatial pattern switching. The first apparatus 110 would then consider the 'updated' RS resource(s) for channel/interference measurements. Note that, the RSs may be e.g., semi-persistent or periodic and thus has periodic occurrences, but may also be aperiodic RSs.

Additionally, in some example embodiments, if the first apparatus 110 may determine that the new spatial pattern is considered to be applied within a period of CSI-RS/SSB resource(s)/occurrence(s) that would be impacted by the new spatial pattern, the first apparatus 110 may then assume that the new spatial pattern is effectively applicable after the period spanned by this resource(s)/occurrence(s).

In a case where the new spatial pattern results in omitting one or more RS resources or RS occurrences, the first apparatus 110 may not consider these RS resources for deriving RS measurements.

The rules listed above may be further specified. In some example embodiments, the first apparatus 110 may be configured to apply some configured (potentially different) scaling separately for the measurement based on RS resources or RS occurrences occurring before and after the spatial pattern switching. The scaling for each part may depend on the number of RS resources or RS occurrences corresponding to that part.

In some example embodiments, the first apparatus 110 may determine a part of the plurality of RS resources or RS occurrences occurring before the spatial pattern switching for deriving CSI, if a number of resource occasions corresponding to the part of RS resources or RS occurrences is greater than a threshold or a number of resource occasions corresponding to another part of the plurality of RS resources or RS occurrences occurring after the spatial pattern switching.

In some example embodiments, the first apparatus 110 may determine a part of the plurality of RS resources or RS occurrences occurring after the spatial pattern switching, if a number of resource occasions corresponding to the part of the plurality of RS resources or RS occurrences is greater than a threshold or a number of resource occasions corresponding to another part of the plurality of RS resources or RS occurrences occurring before the spatial pattern switching.

It should be understood that the rules described for determining the RS resources or RS occurrences adapted to the spatial pattern switching in the example embodiments may be configured from the network, specified (e.g., hard-coded) at the UE, or indicated at the UE via RRC signaling.

After determining the at least on the one or more RS resources or RS occurrences adapted to the spatial pattern switching, the first apparatus 110 may then measure 325 RSs on these RS resources or RS occurrences. In some example embodiments, the one or more measurements may be CSI measurements, and/or the RS may comprise at least one of a CSI-RS, a synchronization signal block (SSB), a tracking reference signal (TRS), a demodulation reference signal (DMRS), etc.

The first apparatus 110 transmits 330 at least one report comprising one or more measurements to the second apparatus 120.

In some example embodiments, the first apparatus 110 may provide two CSI reports, one is based on the RS resources or RS occurrences before the spatial pattern switching, and the one is based on the RS resources or RS occurrences after the spatial pattern switching.

Additionally, or alternatively, in some example embodiments, the first apparatus 110 may select and provide at least one of the two CSI report. The selection may be based on some specified or configured criteria, and the present disclosure is not limited in this regard.

Additionally, or alternatively, in some example embodiments, if a time restriction for channel measurement or for interference measurement is not configured, for example, if the higher layer parameter timeRestrictionForChannelMeasurements in CSI-ReportConfig is set to "notConfigured", the first apparatus 110 may be allowed to derive the RS measurements based on the spatial pattern adaptation solution provided by the above example embodiments.

Additionally, or alternatively, in some example embodiments, if the new spatial pattern has a different number of active or muted antenna/spatial elements (or transceiver units), or the number or set of antenna ports, and/or resource element number than the previous spatial pattern, the first apparatus 110 may be allowed to derive the RS measurements based on the spatial pattern adaptation solution provided by the above example embodiments.

According to the example embodiments, there is provided a solution of the spatial pattern adaptation. This solution ensures that both the gNB and UE have common understanding to which spatial pattern(s) is used for measuring RSs. In this way, spatial pattern switching would not impact channel and interference measurement performance, as it can be suitably adapted to the dynamic switching of antennal or spatial pattern.

It should be understood that some of the steps in process 200 are optional or can be omitted, and the order of the steps is given for an illustrative purpose. Thus, the embodiments of the present disclosure are not limited in this regard.

The example descriptions on the embodiments of the present disclosure as well as possible standardization impacts and information model in the standards are shown as below. However, it should be understood that details, values, configurations in the following description are given as example implementations, not limitations to the embodiments of the present disclosure.

Figure 5:
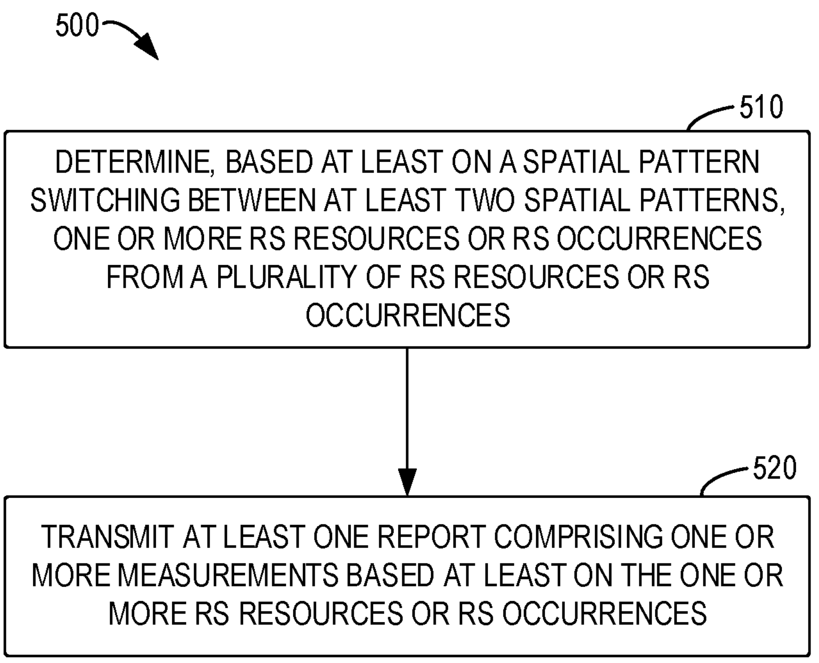
FIG. 5 illustrates a flowchart of a method implemented at a terminal device according to some example embodiments of the present disclosure.

FIG. 5 illustrates a flowchart of a method 500 implemented at a first apparatus according to some example embodiments of the present disclosure. For example, the first apparatus may include a terminal device, such as UE or a part of the UE. For the purpose of discussion, the method 500 will be described from the perspective of the first apparatus 110 in FIG. 1.

At block 510, the first apparatus 110 determines, based at least on a spatial pattern switching between at least two spatial patterns of a network device, one or more RS resources or RS occurrences from a plurality of RS resources or RS occurrences. In the example as shown in FIG. 1, The network device may be the second apparatus 120.

At block 520, the first apparatus 110 transmits, to the network device, at least one report comprising one or more measurements based at least on the one or more RS resources or RS occurrences.

In some example embodiments, the plurality of RS resources or RS occurrences may be associated with at least one of a CSI resource setting or a CSI report configuration.

In some example embodiments, the one or more RS resources or RS occurrences occur after the spatial pattern switching; or the one or more RS resources or RS occurrences occur after a time period from the spatial pattern switching; or the one or more RS resources or RS occurrences occur before the spatial pattern switching; or a part of the one or more RS resources or RS occurrences occur before the spatial pattern switching and another part of the one or more RS resources or RS occurrences occur after the spatial pattern switching.

Additionally, or alternatively, in some example embodiments, the method 500 may further comprise: receiving, from the network device, information related to the spatial pattern switching, wherein the information indicates at least one of the following: the spatial pattern switching is applied when the information is received, the spatial pattern switching is applied after a time period when the information is received, or the spatial pattern switching is applied at a time instant or within a period of time.

In some example embodiments, the method 500 may further comprise: transmit, to the network device, an indication indicating at least one of the following:

the one or more RS resources or RS occurrences occur before the spatial pattern switching, the one or more RS resources or RS occurrences occur after the spatial pattern switching, or a part of the one or more RS resources or RS occurrences occurring before the spatial pattern switching and another part of the one or more RS resources or RS occurrences occur after the spatial pattern switching.

In some example embodiments, the indication may be comprised in uplink control information or uplink medium access control control element, and/or is transmitted together with the one or more measurements.

Additionally, or alternatively, in some example embodiments, the method 500 may further comprise: receiving, from the network device, an indication indicating the one or more RS resources or RS occurrences to be determined by the apparatus from the plurality of RS resources or RS occurrences.

Additionally, or alternatively, in some example embodiments, the method 500 may further comprise: obtaining at least one rule for determining the one or more RS resources or RS occurrences from the plurality of RS resources or RS occurrences, wherein the at least one rule comprises at least one of the following:

the determination of the one or more RS resources or RS occurrences are at least based at least on a part of the plurality of RS resources or RS occurrences occurring before the spatial pattern switching, the determination of the one or more RS resources or RS occurrences are at least based at least on a part of the plurality of RS resources or RS occurrences occurring after the spatial pattern switching, the determination of the one or more RS resources or RS occurrences are at least based on both a part of the plurality of RS resources or RS occurrences occurring before the spatial pattern switching and another part of the plurality of RS resources or RS occurrences occurring after the spatial pattern switching, the determination of the one or more RS resources or RS occurrences are based at least on a part of the plurality of RS resources or RS occurrences occurring after a time period from the spatial pattern switching, the determination of the one or more RS resources or RS occurrences are at least based on a part of the plurality of RS resources or RS occurrences occurring before the spatial pattern switching, if a number of resource occasions corresponding to the part of the plurality of RS resources or RS occurrences is greater than a threshold or a number of resource occasions corresponding to another part of the plurality of RS resources or RS occurrences occurring after the spatial pattern switching, or the determination of the one or more RS resources or RS occurrences are at least based on from a part of the plurality of RS resources or RS occurrences occurring after the spatial pattern switching, if a number of resource occasions corresponding to the part of the plurality of RS resources or RS occurrences is greater than a threshold or a number of resource occasions corresponding to another part of the plurality of RS resources or RS occurrences occurring before the spatial pattern switching.

In some example embodiments, the at least one report may comprise a first report and a second report, wherein the first report comprises one or more measurements based on a part of the plurality of RS resources or RS occurrences occurring after the spatial pattern switching and the second report comprises one or more measurements based on a part of the plurality of RS resources or RS occurrences occurring before the spatial pattern switching.

In some example embodiments, the one or more RS resources or RS occurrences may comprise at least one RS resources or RS occurrences corresponding to at least one CSI reference resource.

In some example embodiments, the one or more measurements may comprise CSI measurements and/or the RS comprises at least one of a CSI-RS, a SSB, a TRS, or a DMRS.

Figure 6:
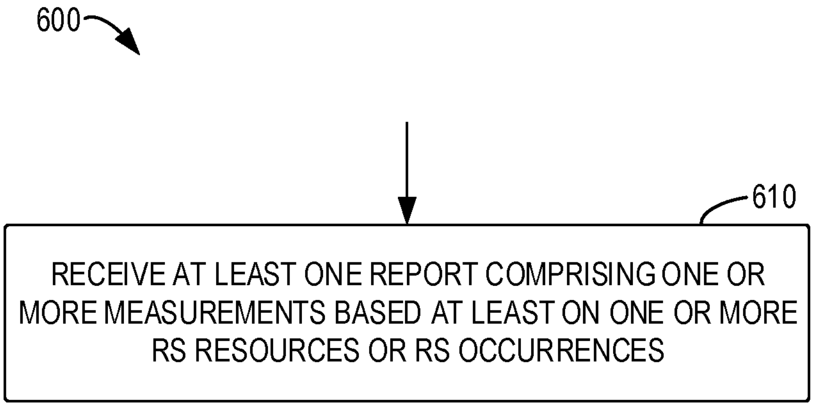
FIG. 6 illustrates a flowchart of a method implemented at a network device according to some example embodiments of the present disclosure.

FIG. 6 illustrates a flowchart of an example method 600 implemented at a second apparatus in accordance with some example embodiments of the present disclosure. For example, the second apparatus may include a network device, such as a gNB or a part of the gNB. For the purpose of discussion, the method 600 will be described from the perspective of the second apparatus 120 in FIG. 1.

At 610, the second apparatus receive, from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the apparatus.

In some example embodiments, the plurality of RS resources or RS occurrences may be associated with at least one of a CSI resource setting or a CSI report configuration.

In some example embodiments, the one or more RS resources or RS occurrences occur after the spatial pattern switching; or the one or more RS resources or RS occurrences occur after a time period from the spatial pattern switching; or the one or more RS resources or RS occurrences occur before the spatial pattern switching; or a part of the one or more RS resources or RS occurrences occur before the spatial pattern switching and another part of the one or more RS resources or RS occurrences occur after the spatial pattern switching.

In some example embodiments, the method 600 may further comprise: transmitting, to the terminal device, information related to the spatial pattern switching, wherein the information indicates at least one of the following:

the spatial pattern switching being applied when the information is received, or the spatial pattern switching being applied after a time period when the information is received.

time instant at which or period of time within which the spatial pattern switching occurs or is applied.

In some example embodiments, the method 600 may further comprise: receiving, from the terminal device, an indication indicating at least one of the following:

the one or more RS resources or RS occurrences occur before the spatial pattern switching, the one or more RS resources or RS occurrences occur after the spatial pattern switching, or a part of the one or more RS resources or RS occurrences occurring before the spatial pattern switching and another part of the one or more RS resources or RS occurrences occur after the spatial pattern switching.

In some example embodiments, the method 600 may further comprise: transmitting, to the terminal device, an indication indicating the one or more RS resources or RS occurrences to be determined by the terminal device from the plurality of RS resources or RS occurrences.

In some example embodiments, the method 600 may further comprise: transmitting, to the terminal device, at least one a rule for determining the one or more RS resources or RS occurrences from the plurality of RS resources, wherein the at least one rule comprises at least one of the following:

the determination of the one or more RS resources or RS occurrences are at least based at least on a part of the plurality of RS resources or RS occurrences occurring before the spatial pattern switching, the determination of the one or more RS resources or RS occurrences are at least based at least on a part of the plurality of RS resources or RS occurrences occurring after the spatial pattern switching, the determination of the one or more RS resources or RS occurrences are at least based on both a part of the plurality of RS resources or RS occurrences occurring before the spatial pattern switching and another part of the plurality of RS resources or RS occurrences occurring after the spatial pattern switching, the determination of the one or more RS resources or RS occurrences are at least based on a part of the plurality of RS resources or RS occurrences occurring after a time period from the spatial pattern switching, the determination of the one or more RS resources or RS occurrences are at least based on a part of the plurality of RS resources or RS occurrences occurring before the spatial pattern switching, if a number of resource occasions corresponding to the part of the plurality of RS resources or RS occurrences is greater than a threshold or a number of resource occasions corresponding to another part of the plurality of RS resources or RS occurrences occurring after the spatial pattern switching, or the determination of the one or more RS resources or RS occurrences are at least based on from a part of the plurality of RS resources or RS occurrences occurring after the spatial pattern switching, if a number of resource occasions corresponding to the part of the plurality of RS resources or RS occurrences is greater than a threshold or a number of resource occasions corresponding to another part of the plurality of RS resources or RS occurrences occurring before the spatial pattern switching.

In some example embodiments, an apparatus capable of performing any of the method 500 (for example, the first apparatus 110 in FIG. 1) may comprise means for performing the respective operations of the method 500. The means may be implemented in any suitable form. For example, the means may be implemented in a circuitry or software module. The apparatus may be implemented as or included in the first apparatus 110 in FIG. 1.

In some example embodiments, the apparatus comprises: means for determining, based at least on a spatial pattern switching between at least two spatial patterns of a network device, one or more RS resources or RS occurrences from a plurality of RS resources or RS occurrences; and means for transmitting, to the network device, at least one report comprising one or more measurements based at least on the one or more RS resources or RS occurrences.

In some example embodiments, the plurality of RS resources or RS occurrences are associated with at least one of a channel state information, CSI, resource setting or a CSI report configuration.

In some example embodiments, wherein the one or more RS resources or RS occurrences occur after the spatial pattern switching; or the one or more RS resources or RS occurrences occur after a time period from the spatial pattern switching; or the one or more RS resources or RS occurrences occur before the spatial pattern switching; or a part of the one or more RS resources or RS occurrences occur before the spatial pattern switching and another part of the one or more RS resources or RS occurrences occur after the spatial pattern switching.

In some example embodiments, the apparatus further comprises: means for receiving, from the network device, information related to the spatial pattern switching, wherein the information indicates at least one of the following:

the spatial pattern switching is applied when the information is received, the spatial pattern switching is applied after a time period when the information is received, the spatial pattern switching is applied at a time instant or within a period of time.

In some example embodiments, the apparatus further comprises: means for transmitting, to the network device, an indication indicating at least one of the following:

the one or more RS resources or RS occurrences occur before the spatial pattern switching, the one or more RS resources or RS occurrences occur after the spatial pattern switching, or a part of the one or more RS resources or RS occurrences occurring before the spatial pattern switching and another part of the one or more RS resources or RS occurrences occur after the spatial pattern switching.

In some example embodiments, the indication is comprised in uplink control information or uplink medium access control control element, and/or is transmitted together with the one or more measurement.

In some example embodiments, the apparatus further comprises: means for receiving, from the network device, an indication indicating the one or more RS resources or RS occurrences to be determined by the apparatus from the plurality of RS resources or RS occurrences.

In some example embodiments, the apparatus further comprises: means for obtaining at least one rule for determining the one or more RS resources or RS occurrences from the plurality of RS resources or RS occurrences, wherein the at least one rule comprises at least one of the following:

the determination of the one or more RS resources or RS occurrences are at least based at least on a part of the plurality of RS resources or RS occurrences occurring before the spatial pattern switching, the determination of the one or more RS resources or RS occurrences are at least based at least on a part of the plurality of RS resources or RS occurrences occurring after the spatial pattern switching, the determination of the one or more RS resources or RS occurrences are at least based on both a part of the plurality of RS resources or RS occurrences occurring before the spatial pattern switching and another part of the plurality of RS resources or RS occurrences occurring after the spatial pattern switching, the determination of the one or more RS resources or RS occurrences are based at least on a part of the plurality of RS resources or RS occurrences occurring after a time period from the spatial pattern switching, the determination of the one or more RS resources or RS occurrences are at least based on a part of the plurality of RS resources or RS occurrences occurring before the spatial pattern switching, if a number of resource occasions corresponding to the part of the plurality of RS resources or RS occurrences is greater than a threshold or a number of resource occasions corresponding to another part of the plurality of RS resources or RS occurrences occurring after the spatial pattern switching, or the determination of the one or more RS resources or RS occurrences are at least based on from a part of the plurality of RS resources or RS occurrences occurring after the spatial pattern switching, if a number of resource occasions corresponding to the part of the plurality of RS resources or RS occurrences is greater than a threshold or a number of resource occasions corresponding to another part of the plurality of RS resources or RS occurrences occurring before the spatial pattern switching.

In some example embodiments, the at least one report comprises a first report and a second report, wherein the first report comprises one or more measurements based on a part of the plurality of RS resources or RS occurrences occurring after the spatial pattern switching and the second report comprises one or more measurements based on a part of the plurality of RS resources or RS occurrences occurring before the spatial pattern switching.

In some example embodiments, the one or more RS resources or RS occurrences comprises at least one RS resources or RS occurrences corresponding to at least one CSI reference resource.

In some example embodiments, the one or more measurements comprise CSI measurements and/or the RS comprises at least one of a CSI-RS, a synchronization signal block, SSB, a tracking reference signal, TRS, or a demodulation reference signal, DMRS.

In some example embodiments, an apparatus capable of performing any of the method 600 (for example, the second apparatus 120 in FIG. 1) may comprise means for performing the respective operations of the method 600. The means may be implemented in any suitable form. For example, the means may be implemented in a circuitry or software module. The apparatus may be implemented as or included in the second apparatus 120 in FIG. 1.

In some example embodiments, the apparatus comprises: means for receiving, from a terminal device, at least one report comprising one or more measurements based at least on one or more RS resources or RS occurrences, wherein the one or more RS resources or RS occurrences are determined from a plurality of RS resources or RS occurrences, based at least on a spatial pattern switching between at least two spatial patterns of the apparatus.

In some example embodiments, the plurality of RS resources or RS occurrences are associated with at least one of a channel state information, CSI, resource setting or a CSI report configuration.

In some example embodiments, wherein the one or more RS resources or RS occurrences occur after the spatial pattern switching; or the one or more RS resources or RS occurrences occur after a time period from the spatial pattern switching; or the one or more RS resources or RS occurrences occur before the spatial pattern switching; or a part of the one or more RS resources or RS occurrences occur before the spatial pattern switching and another part of the one or more RS resources or RS occurrences occur after the spatial pattern switching.

In some example embodiments, the apparatus further comprises: means for transmitting, to the terminal device, information related to the spatial pattern switching, wherein the information indicates at least one of the following:

the spatial pattern switching being applied when the information is received, or the spatial pattern switching being applied after a time period when the information is received.

time instant at which or period of time within which the spatial pattern switching occurs or is applied.

In some example embodiments, the apparatus further comprises: means for receiving, from the terminal device, an indication indicating at least one of the following:

the one or more RS resources or RS occurrences occur before the spatial pattern switching, the one or more RS resources or RS occurrences occur after the spatial pattern switching, or a part of the one or more RS resources or RS occurrences occurring before the spatial pattern switching and another part of the one or more RS resources or RS occurrences occur after the spatial pattern switching.

In some example embodiments, the apparatus further comprises: means for transmitting, to the terminal device, an indication indicating the one or more RS resources or RS occurrences to be determined by the terminal device from the plurality of RS resources or RS occurrences.

In some example embodiments, the apparatus further comprises: means for transmitting, to the terminal device, at least one a rule for determining the one or more RS resources or RS occurrences from the plurality of RS resources, wherein the at least one rule comprises at least one of the following:

the determination of the one or more RS resources or RS occurrences are at least based at least on a part of the plurality of RS resources or RS occurrences occurring before the spatial pattern switching, the determination of the one or more RS resources or RS occurrences are at least based at least on a part of the plurality of RS resources or RS occurrences occurring after the spatial pattern switching, the determination of the one or more RS resources or RS occurrences are at least based on both a part of the plurality of RS resources or RS occurrences occurring before the spatial pattern switching and another part of the plurality of RS resources or RS occurrences occurring after the spatial pattern switching, the determination of the one or more RS resources or RS occurrences are at least based on a part of the plurality of RS resources or RS occurrences occurring after a time period from the spatial pattern switching, the determination of the one or more RS resources or RS occurrences are at least based on a part of the plurality of RS resources or RS occurrences occurring before the spatial pattern switching, if a number of resource occasions corresponding to the part of the plurality of RS resources or RS occurrences is greater than a threshold or a number of resource occasions corresponding to another part of the plurality of RS resources or RS occurrences occurring after the spatial pattern switching, or the determination of the one or more RS resources or RS occurrences are at least based on from a part of the plurality of RS resources or RS occurrences occurring after the spatial pattern switching, if a number of resource occasions corresponding to the part of the plurality of RS resources or RS occurrences is greater than a threshold or a number of resource occasions corresponding to another part of the plurality of RS resources or RS occurrences occurring before the spatial pattern switching.

Figure 7:
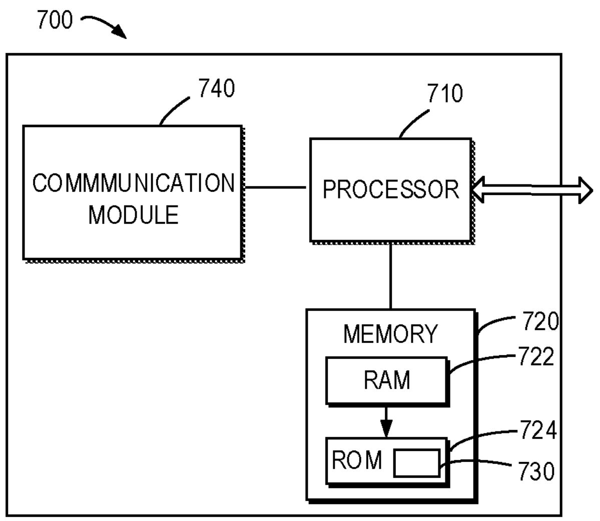
FIG. 7 illustrates a simplified block diagram of a device that is suitable for implementing example embodiments of the present disclosure.

FIG. 7 is a simplified block diagram of a device 700 that is suitable for implementing example embodiments of the present disclosure. The device 700 may be provided to implement an electronic device, for example, the first apparatus 110 and the second apparatus 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
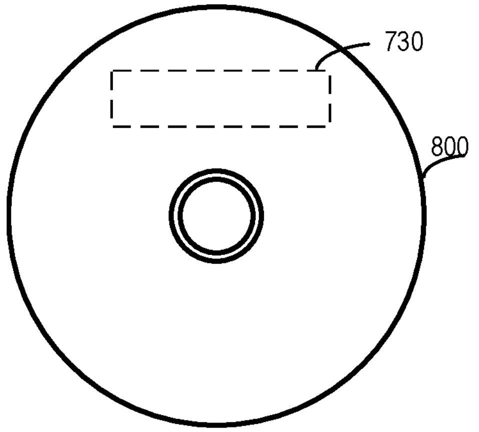
FIG. 8 illustrates a block diagram of an example computer readable medium in accordance with some example embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:

at least one processor; and at least one memory storing instructions that, when executed by the at least one processor, cause the apparatus at least to:

receive, from a network device, a first indication indicating:

one or more reference signal (RS) resources to be determined by the apparatus from a plurality of RS resources, and one or more RS occurrences to be determined by the apparatus from a plurality of RS occurrences;

obtain a plurality of rules for determining the one or more RS resources from the plurality of RS resources and the one or more RS occurrences from the plurality of RS occurrences, wherein the plurality of rules comprise all of the following:

the determination of the one or more RS resources or RS occurrences are at least based at least on a part of the plurality of RS resources or RS occurrences occurring before spatial pattern switching, the determination of the one or more RS resources or RS occurrences are at least based at least on a part of the plurality of RS resources or RS occurrences occurring after the spatial pattern switching, the determination of the one or more RS resources or RS occurrences are at least based on both a part of the plurality of RS resources or RS occurrences occurring before the spatial pattern switching and another part of the plurality of RS resources or RS occurrences occurring after the spatial pattern switching, the determination of the one or more RS resources or RS occurrences are based at least on a part of the plurality of RS resources or RS occurrences occurring after a time period from the spatial pattern switching, the determination of the one or more RS resources or RS occurrences are at least based on a part of the plurality of RS resources or RS occurrences occurring before the spatial pattern switching, if a number of resource occasions corresponding to the part of the plurality of RS resources or RS occurrences is greater than a threshold or a number of resource occasions corresponding to another part of the plurality of RS resources or RS occurrences occurring after the spatial pattern switching, and the determination of the one or more RS resources or RS occurrences are at least based on a part of the plurality of RS resources or RS occurrences occurring after the spatial pattern switching, if a number of resource occasions corresponding to the part of the plurality of RS resources or RS occurrences is greater than a threshold or a number of resource occasions corresponding to another part of the plurality of RS resources or RS occurrences occurring before the spatial pattern switching;

determine, based at least on a spatial pattern switching between at least two spatial patterns of a network device, the one or more RS resources from the plurality of RS resources and the one or more RS occurrences from the plurality of RS occurrences, wherein the plurality of RS resources and the plurality of RS occurrences are associated with a channel state information (CSI) resource setting and with a CSI report configuration, wherein the apparatus is triggered of each CSI-RS transmission by signaling in downlink control information (DCI), wherein the CSI-RS are aperiodic;

transmit, to the network device, at least one report comprising measurements based at least on the one or more RS resources and the one or more RS occurrences, wherein the at least one report comprises a first report and a second report, wherein the first report comprises one or more measurements based on a part of the plurality of RS resources or RS occurrences occurring after the spatial pattern switching and the second report comprises one or more measurements based on a part of the plurality of RS resources or RS occurrences occurring before the spatial pattern switching, wherein the apparatus is configured to apply scaling separately for part of the measurements based on RS resources or RS occurrences occurring before the spatial pattern switching and for part of the measurements based on RS resources or RS occurrences occurring after the spatial pattern switching, wherein the scaling for each part is based on number of RS resources or RS occurrences corresponding to the respective part;

receive, from the network device, information related to the spatial pattern switching, wherein the information indicates all of the following:

the spatial pattern switching is applied when the information is received, the spatial pattern switching is applied after a time period when the information is received, and the spatial pattern switching is applied at a time instant or within a period of time;

transmit, to the network device, a second indication indicating all of the following:

the one or more RS resources occur before the spatial pattern switching, and the one or more RS occurrences occur after the spatial pattern switching, wherein the second indication is comprised in uplink medium access control control element and is transmitted together with the measurements.

* * * * *